April 7, 1959

J. R. STEVENSON ET AL 2,880,833

TRACTOR CONTROL MECHANISM

Filed May 17, 1952

INVENTORS,
J. R. STEVENSON,
D. W. LYSETT,
R. C. ZEIDLER

BY

ATTORNEYS

INVENTORS,
J. R. STEVENSON,
D. W. LYSETT,
R. C. ZEIDLER

ATTORNEYS

April 7, 1959    J. R. STEVENSON ET AL    2,880,833
TRACTOR CONTROL MECHANISM

Filed May 17, 1952    4 Sheets-Sheet 3

INVENTORS,
J. R. STEVENSON,
D. W. LYSETT,
R. C. ZEIDLER

BY E. C. McRae
J. R. Faulkner
L. H. Oster

ATTORNEYS

INVENTORS,
J. R. STEVENSON,
D. W. LYSETT,
R. C. ZEIDLER

ATTORNEYS

United States Patent Office 2,880,833
Patented Apr. 7, 1959

2,880,833

TRACTOR CONTROL MECHANISM

James R. Stevenson, Farmington, Daniel W. Lysett, Birmingham, and Reinhold C. Zeidler, Detroit, Mich., assignors to Ford Motor Company, Dearborn, Mich., a corporation of Delaware Application May 17, 1952, Serial No. 288,500

12 Claims. (Cl. 192—48)

This invention relates generally to tractors, and more particularly to control mechanisms for tractors.

An object of the present invention is to provide improve control mechanism for a tractor of the type in which the engine power is utilized not only to drive the rear traction wheels of the tractor but also to provide mechanical power for operating implements and accessories and hydraulic power for raising and lowering implements and controlling the operation thereof. A further object is to provide tractor control mechanism comprising a pair of adjacent concentric clutches, one for the transmission shaft to control the transmission of power to the rear traction wheels and the other for the power take-off shaft to control the transmission of power to the implements and accessories, with the two clutches being so constructed and arranged as to be released by a single release member common to both clutches.

Still another object of the invention is to provide tractor control mechanism utilizing a pair of clutches to control the transmission of power to the traction wheels and to the power take-off shaft respectively in which the two clutches are normally engaged and can be disengaged in sequence by the operation of a single release member, with the initial movement of the release member disengaging the clutch controlling the transmission of power to the wheels and with further movement of the release member in the same direction subsequently disengaging the clutch controlling the transmission of power to the power take-off shaft.

A still further object of the invention is to provide control mechanism of this type in which the operation of a single release member enables the transmission of power to the tractor wheels to be interrupted without interfering with the continued operation of the power take-off shaft, or alternatively, permits both the tractor wheels and the power take-off shaft to be disconnected from the engine.

Another object is to provide a control mechanism of this type in which the clutch mechanism and clutch release mechanism are compactly arranged and designed for economical production.

Other objects and advantages of the present invention will be made more apparent as this description proceeds, particularly when considered in connection with the accompanying drawings, wherein:

Figure 7 is a fragmentary side elevational view of a portion of Figure 1, showing the clutch pedal linkage.

Figure 1:
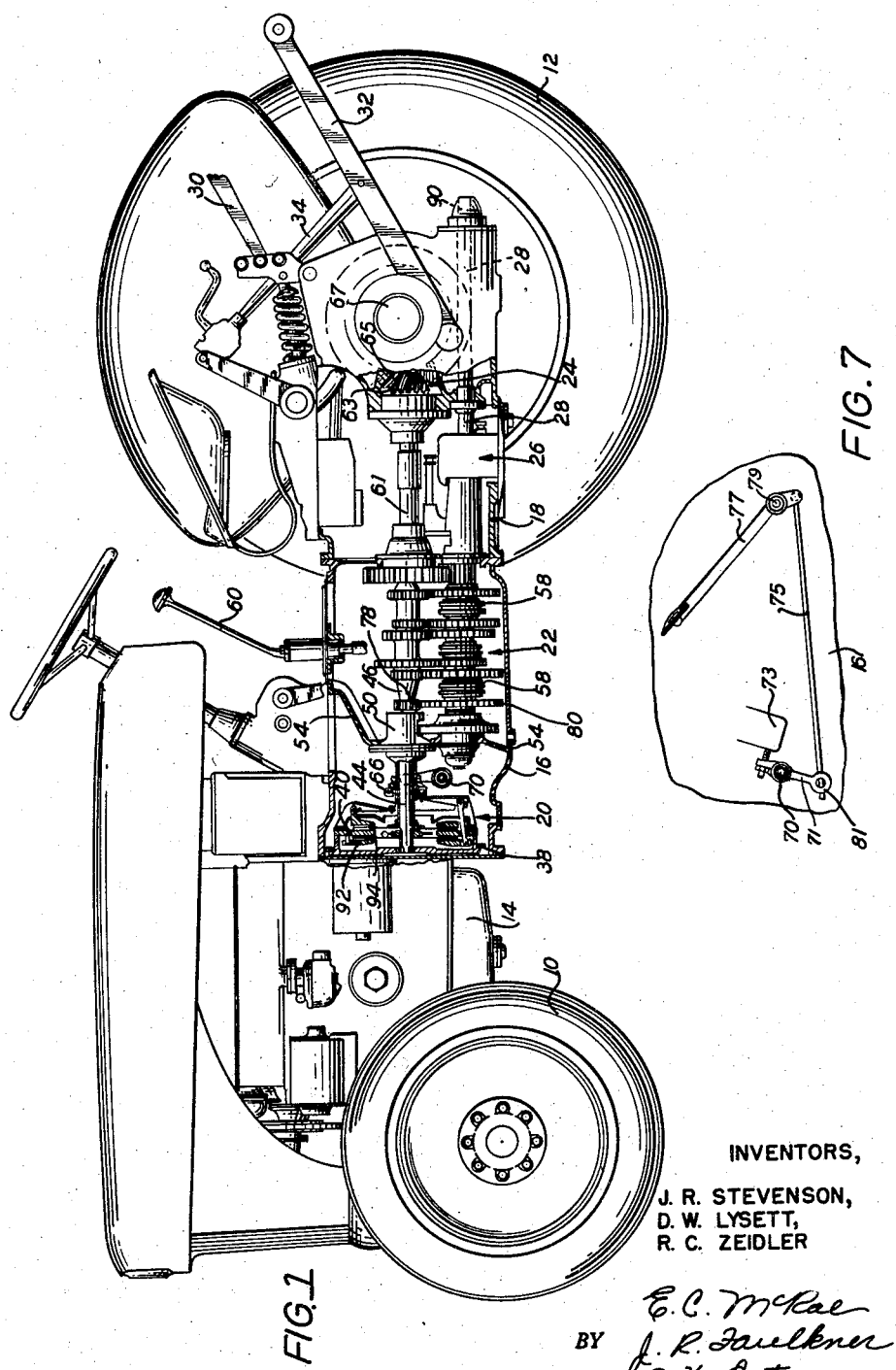
Figure 1 is a side elevation, partly broken away and in section, of a tractor embodying the present invention.

Referring now to the drawings, and particularly to Figure 1, there is shown an agricultural tractor having front steering wheels 10 and rear traction wheels 12 carried by a tractor chassis comprising an internal combustion engine 14, a clutch and transmission housing 16, and a rear axle housing 18. The housing 16 contains a double clutch assembly 20 and a transmission 22 of the spur gear type. The housing 18 contains a rear axle assembly 24, a hydraulic pump unit 26, and a power take-off shaft 28. The tractor also is equipped with conventional upper and lower links 30 and 32 respectively, and lifting links 34 actuated by conventional hydraulic mechanism (not shown) for raising and lowering the links and any implement which may be connected thereto.

Figure 2:
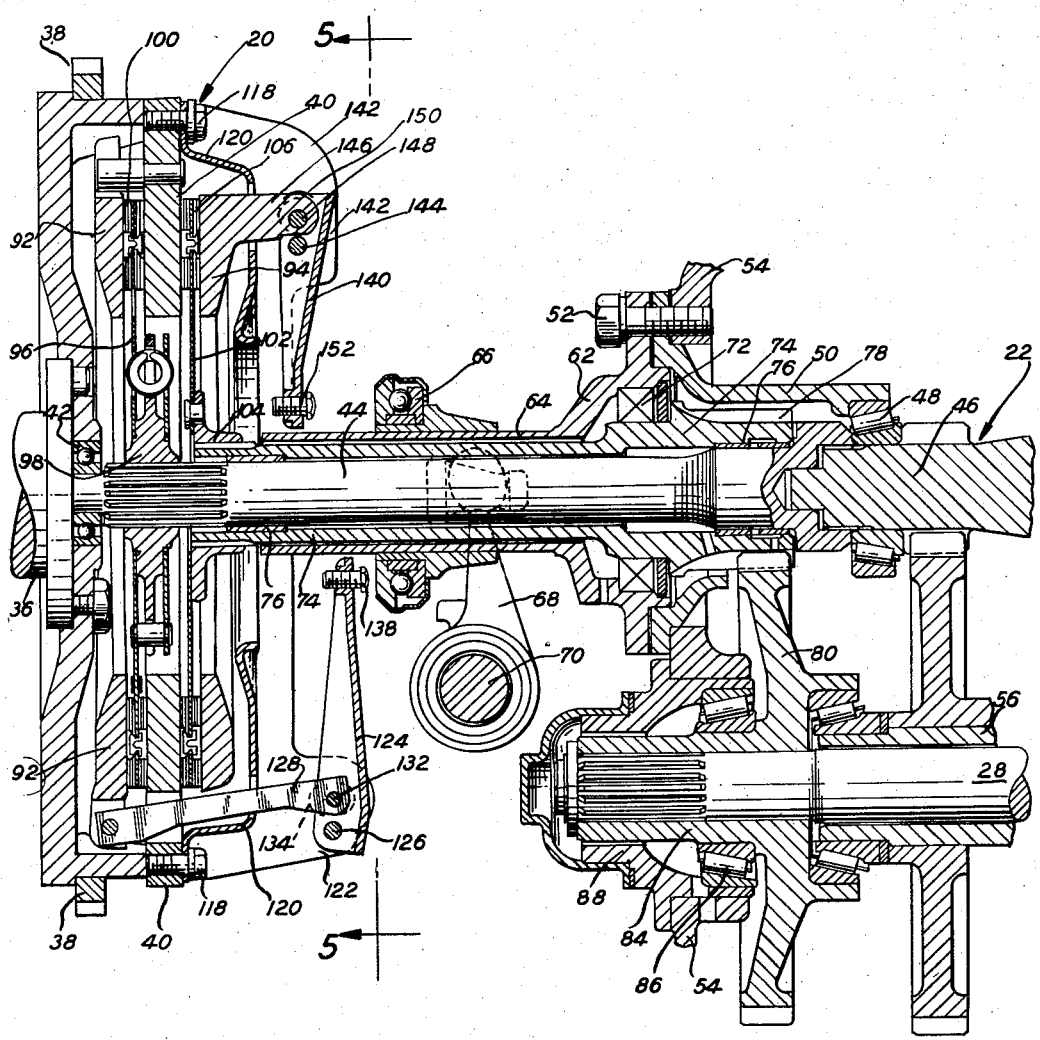
Figure 2 is an enlarged cross-sectional view of a portion of the structure shown in Figure 1, illustrating the two clutches in their normally engaged positions.

With reference now to both Figures 1 and 2, the crank shaft 36 of the engine carries at its rearward end a flywheel 38, which in turn supports a center driving plate 40 for rotation therewith as a unit. Bearings 42 are carried by the flywheel 38 and pilot the forward end of an intermediate shaft 44, the rearward end of which is splined to the transmission main shaft 46. The forward end of the transmission main shaft 46 is journaled in bearings 48 carried in a hub 50 secured by bolts 52 to an intermediate wall 54 of the clutch and transmission housing 16.

As best seen in Figure 1, the transmission 22 is of the conventional spur gear type, having a plurality of gears arranged in intermeshing relationship upon the main shaft 46 and the hollow counter shaft 56 respectively. Conventional shifting collars 58 are adapted to be shifted by means of the manual gear shift lever 60 and shifting forks (not shown) to provide a plurality of forward and reverse speeds in the transmission and to deliver the output power to a drive shaft 61 mounted in the rear axle housing 18. The drive shaft 61 carries at its rear end a driving pinion 63 meshing with a ring gear 65 carried by the rear axle 67.

As shown in Figure 2, the bolts 52 securing the hub 50 to the intermediate wall 54 of the housing 16 also support thereon a hub 62 having a forwardly extending sleeve 64 arranged concentrically with the intermediate shaft 44. A clutch throwout bearing 66 is slidably mounted upon the sleeve 64 and is arranged to be axially moved by means of a bifurcated fork 68 mounted upon a clutch operating shaft 70. The clutch throwout bearing 66 is adapted to control the double clutch 20 in the manner to be more fully described hereinafter.

The clutch operating shaft 70 extends through the side of the housing 16 and supports a lever 71, the upper arm of which is adapted to engage an abutment 73 formed on the housing to provide positive release stop. The lever 71 is connected by a link 75 to the lower end of the clutch pedal arm 77, pivotally mounted upon the clutch pedal shaft 79. An adjustable connection 81 between the lever 71 and link 75 permits adjustment for wear.

The shaft 44 supports a sleeve 74 coaxially surrounding the intermediate shaft 44 between said shaft and the sleeve 64. The forward and rearward ends of the sleeve 74 are journaled upon the intermediate shaft 44 by bushings 76. A seal 72 is located between the sleeve 74 and the hub 62.

At its rearward end the intermediate sleeve 74 has formed thereon a pinion 78 arranged in constant mesh with a gear 80 splined upon the forward end of the power take-off shaft 28. The hub 84 of the gear 80 is journaled in bearings 86 carried by a sleeve 88 supported upon the intermediate wall 54 of the clutch and transmission housing 16. The power take-off shaft 28 extends rearwardly through the hollow transmission countershaft 56 and has a rearward end portion 90 extending outwardly beyond the rearward end of the rear axle housing 18 of the tractor in a position to be readily accessible for connecting implements and accessories thereto.

Intermediate its ends the power take-off shaft drives the hydraulic pump 26 which supplies hydraulic power for operating the lifting links 34 and also for providing hydraulic power for certain implements and accessories.

From the foregoing it will be apparent that the transmission main shaft 46 and the rear traction wheels 12 of the tractor are driven through the intermediate shaft 44; and that the power take-off shaft 28 and the hydraulic pump 26 are driven through the sleeve 74 concentrically surrounding the intermediate shaft 44. Power is supplied to the shaft 44 and sleeve 74 through the double clutch assembly 20 in the manner described hereinafter.

As previously mentioned, the center driving plate 40 of the clutch assembly is carried upon the flywheel 38 of the engine. Front and rear pressure plates 92 and 94 respectively are supported upon the center driving plate 40 on opposite sides thereof and are mounted for axial sliding movement relative thereto. A conventional clutch disk 96 is carried upon a hub 98 splined upon the forward end of the intermediate shaft 44, and is provided with annular friction disks 100 on opposite sides of the outer periphery of the disk. The linings 100 are thus positioned between the center driving plate 40 of the clutch assembly and the front pressure plate 92. A second clutch disk 102 is supported upon a hub 104 which in turn is slidably mounted upon the forward splined end of the intermediate sleeve 74. The clutch disk 102 carried at its outer periphery frictions linings 106 arranged on opposite sides of the disk 102 and positioned between the center driving plate 40 of the clutch assembly and the rear pressure plate 94.

Figure 5:
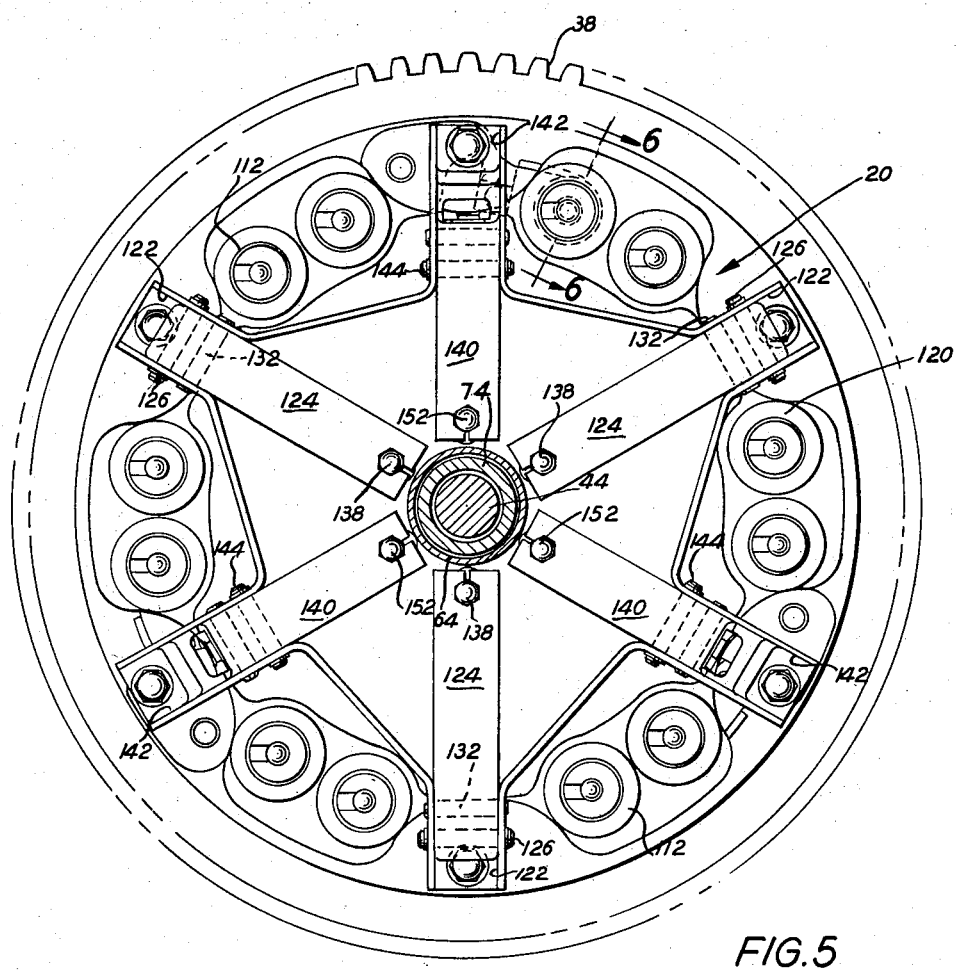
Figure 5 is a cross-sectional view taken on the plane indicated by the line 5—5 of Figure 2, illustrating the clutch mechanism largely in elevation.
Figure 6:
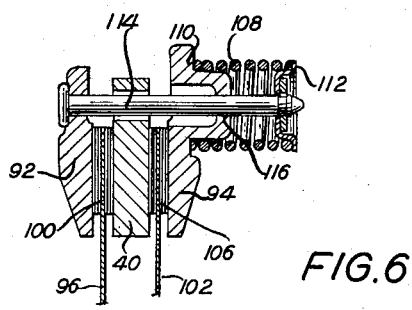
Figure 6 is a cross-sectional view taken on the plane indicated by the line 6—6 of Figure 5.

Reference is now made to Figures 5 and 6 in which the reference character 108 indicates clutch springs arranged between flanges 110 formed at the outer periphery of the rear pressure plate 94 and spring retainers 112 mounted upon the rearward ends of pins 114 carried at the outer periphery of the front pressure plate 92 and extending through apertures 116 in the rear pressure plate 94. Twelve clutch springs 108 are provided, in groups of two, around the periphery of the pressure plates to normally urge the front and rear pressure plates toward the center driving plate 40 and to engage the friction linings 100 and 106 of the front and rear clutch disks 96 and 102 respectively between the pressure plates and the center driving plate. It will be seen that both sections of the double clutch assembly 20 are normally held engaged so that engine power is transmitted to the rear tractor wheels and also to the power take-off shaft through the intermediate shaft 44 and the intermediate sleeve 74 respectively.

Often in tractor operation it is desirable to continue the transmission of power to the power take-off shaft while temporarily interrupting the transmission of power to the traction wheels. For example, it may be necessary to operate a front end loader through the hydraulic power source when the tractor is stopped. Also, implements such as balers and combines may require power when the tractor is stopped, and often it may be possible to clear a jam in an implement of this type by stopping the tractor and transmitting the entire engine torque through the power takeoff shaft to the implement for a short period of time. This is accomplished in the present construction by means of the double clutch assembly 20 and the manner in which it is operated.

The center driving plate 40 of the clutch assembly 20 has secured thereto by bolts 118 a covering stamping in the form of a spider 120 having, as best seen in Figure 5, six angularly spaced radially extending bifurcated guideways 122. Each of these bifurcated guideways has pivotally mounted between its opposed sides a clutch release lever of U-shaped cross-section. The clutch release levers are of two types, three of the levers being for the purpose of disengaging the front pressure plate 92 from the adjacent clutch linings 100 of the front clutch, and the other three clutch release levers being for the purpose of disengaging the rear pressure plate 94 from the clutch linings 106 of the rear clutch.

Referring now to Figure 2, the clutch release levers 124 for the front pressure plate 92 are received between the bifurcations of the guideways 122, being pivotally connected thereto by means of pivot pins 126. Three release levers 124 are provided, equally angularly spaced from each other. The release levers 124 are connected to the front pressure plate 92 by means of links 128 which are U-shaped in cross-section. The forward ends of the links 128 are pivotally connected by pivot pins 130 to the outer periphery of the pressure plate 92. The rearward end of the links 128 are received between the sides of the U-shaped release lever 124 and are pivotally connected thereto by pins 132.

It will be noted that the pivotal connections 126 of the release levers 124 to the spider 120 is at the outer end of the release levers, radially outwardly beyond the pivotal connections 132 of the levers to the links 128. Suitable slots 134 are provided in the bifurcations of the guideways 122 to provide clearance for the heads of the pivot pins 132 as the release levers are pivoted about their pivots 126. The radially inner ends of the release levers 124 carry adjustable studs 138 arranged to be engaged by the clutch throwout bearing 66.

Intermediate the three equally spaced clutch release levers 124 for the front pressure plate are a series of three equally spaced clutch release levers 140 for the rear pressure plate. The release levers 140 are somewhat similar to the release levers 124, being U-shaped in cross-section, but are considerably shorter. The clutch levers 140 are guided between the bifurcations of the guideways 142 of the spider 120, the levers being pivotally connected thereto by means of pivot pins 144. Radially outwardly beyond the pivot pins 144 the clutch release levers 140 are pivotally connected to extensions 146 of the rear pressure plate 94 by means of pivot pins 148. Slots 150 in the bifurcations of the guideways 142 provide clearance for the heads of the pivot pins 148. The radially inner ends of the clutch release levers 140 support adjustable studs 152 positioned for engagement by the clutch throwout bearing 66.

It will be apparent that swinging movement of the clutch release levers 124 resulting from a forward axial force supplied to the adjustable studs 138 results in moving the front pressure plate 92 forwardly away from the center driving plate 40 and releasing the friction linings 100 of the front clutch from frictional engagement with the front pressure plate and the center driving plate. Likewise, swinging movement of the clutch release levers 140 resulting from a forward axial force supplied to the adjustable studs 152 carried by the levers results in moving the rear pressure plate 94 rearwardly away from the center driving plate 40 and disengaging the clutch linings 106 for the rear clutch from frictional engagement with the rear pressure plate and the center driving plate.

By means of the present invention the front and rear clutches controlling the transmission of power to the tractor wheels and the power takeoff shaft respectively, are operated in sequence by movement of the clutch throwout bearing 66 in a forward axial direction. The throwout bearing is actuated by means of the clutch operating shaft 70 and fork 68. In the normally engaged positions of the front and rear clutches as shown in Figure 2, the clutch release levers 124 and 140 for the front and rear clutches respectively are positioned as shown. It will be noted that the clutch throwout bearing 66 is spaced a distance rearwardly from the adjustable studs 138 to provide for wear for the clutch lining which would move the normally engaged positions of the clutch release levers rearwardly.

Initial depression of the conventional clutch pedal rotates the clutch operating shaft 70 and the fork 68 carried thereby and moves the clutch throwout bearing forwardly to take up the clearance between the bearing and the studs 138 carried at the inner ends of the clutch release levers 124. Subsequent movement of the clutch throwout bearing 66 in a forward direction results in swinging the clutch release levers 124 for the front clutch from the position shown in Figure 2 to the position shown in Figure 3, moving the front pressure plate 92 away from the center driving plate 40 to release the front clutch disk 96 from engagement therewith. This results in disconnecting the intermediate shaft 44 from the flywheel and consequently interrupts the transmission of power from the engine to the rear traction wheels of the tractor.

Figure 3:
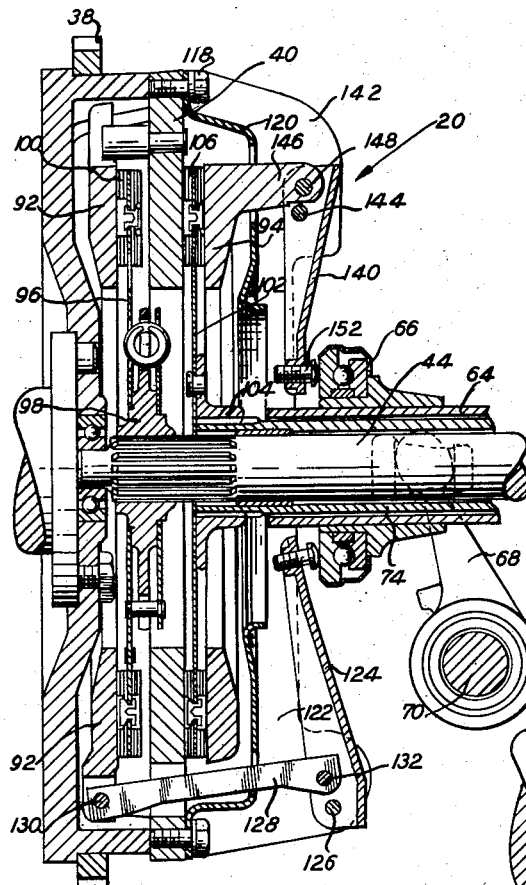
Figure 3 is a cross-sectional view similar to part of Figure 2, but illustrating the relative position of the parts after the clutch release mechanism has been moved through its first stage to disengage the clutch controlling the transmission of power to the transmission shaft and the tractor wheels.

It will be noted upon an examination of Figure 3 that the foresaid release of the front clutch is affected prior to engagement of the clutch throwout bearing 66 with the studs 152 carried by the clutch release levers 140 for the rear clutch. Consequently, power is transmitted without interruption through the rear clutch to the intermediate sleeve 74 and thence to the power take-off shaft 28 and the hydraulic pump 26, permitting the latter to be driven even though the tractor is stopped.

Figure 4:
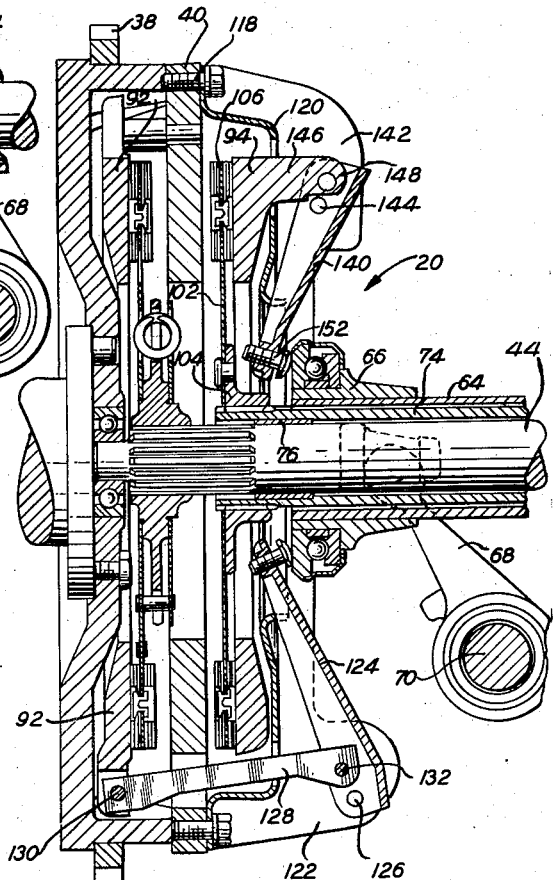
Figure 4 is a view similar to Figure 3 but illustrating the relative position of the parts after the clutch release mechanism has moved through its second stage to also disengage the second clutch controlling the transmission of power to the pump and power take-off shaft.

Continued forward movement of the clutch throwout bearing 66 by further depression of the clutch pedal results in engagement of the throwout bearing with the studs 152 carried at the inner ends of the clutch release levers 140 for the rear clutch, and swings the levers 140 from the position shown in Figure 3 to the position shown in Figure 4. In the latter position, the rear pressure plate 94 has been moved rearwardly by the clutch release levers 140 away from the center driving plate 40 to disengage the rear clutch disk 102 and the friction lining 106 carried thereby from frictional engagement with the pressure plate and center driving plate. This of course interrupts the transmission of power from the engine to the intermediate sleeve 74 and the power takeoff shaft and the hydraulic pump. At the same time, the clutch release levers 124 for the front clutch are additionally moved to move the front pressure plate 92 farther from the center driving plate, and it will be apparent that the front clutch is thus held disengaged so that no power is transmitted to the rear wheels.

Upon release of the clutch pedal and the consequent rearward movement of the clutch throwout bearing 66, the front and rear clutches are re-engaged with their respective pressure plates and center driving plate in reverse order. In other words, the rear clutch disk 102 is first engaged to complete the power train to the power take-off shaft and subsequently the front clutch disk 96 is engaged to complete the power train to the tractor wheels. This clutch engagement is under the action of the clutch springs 108.

In the event it is desired to utilize the power take-off shaft or the hydraulic pump for any continued period of time while the tractor is stopped, it is a simple matter to shift the transmission into neutral so that clutch pedal can be released and both the front and rear clutches engaged without transmitting power to the tractor wheels. In many instances however, such as with front end loaders, balers, and combines, the power take-off shaft and the hydraulic pump need only be operated for a short interval while the tractor is stopped, following which the tractor is again started. Consequently, for these short intervals it is satisfactory for the operator to hold the clutch throwout bearing in the intermediate position in which the front clutch is disengaged while the rear clutch is still engaged. The control for the two clutches controlling the power transmission to the rear wheels and the power take-off shaft respectively is thus readily operated by means of a single clutch throwout mechanism and a single action of the tractor operator without the necessity of adding additional control mechanism. As stated before, movement of the clutch throwout mechanism in the forward direction first releases the front clutch to the transmission and rear wheels and subsequent movement of the clutch throwout mechanism in the same direction thereafter releases the rear clutch to the power take-off shaft and the hydraulic pump while at the same time holding the first clutch released.

It will be understood that the invention is not to be limited to the exact construction shown and described, but that various changes and modifications may be made without departing from the spirit and scope of the invention, as defined in the appended claims.

What is claimed is:

1. In an agricultural tractor having an engine flywheel, traction wheels, and power takeoff wheels, the improvement comprising a driving plate operatively connected to said flywheel to be driven thereby, said driving plate have friction surfaces on the opposite faces thereof, a pair of axially movable clutch members on opposite sides of said driving plate, spring means normally holding said clutch members in frictional engagement with the opposite frictional faces of said driving plate, a set of throwout levers for each of said clutch members, one set of throwout levers being offset axially from the other set of the throwout levers, said levers being arranged to disengage said clutch members from said driving plate upon movement in a common direction, a clutch throwout bearing mounted for axial movement concentric with said plate and clutch members, one of said clutch members being adapted to be connected to the traction wheels and the other of said clutch members being adapted to be connected to the power take-off means, the throwout levers for said one clutch member being arranged in the path of the initial movement of said clutch throwout bearing to disengage said one clutch member from said driving plate to disconnect the power drive to said traction wheels prior to engagement of the clutch throwout bearing with the offset throwout levers for the other of said clutch members, the last mentioned throwout levers however, being in a path of further movement of said clutch throwout bearing in the same direction beyond the travel necessary to disengage said one clutch member from one side of said driving plate to thereupon disengage said other clutch member from the opposite side of said driving plate to disconnect the power drive to said power take-off means.

2. The structure defined by claim 1 which is further characterized in that a spider is carried by said driving plate and pivotally supports said clutch throwout levers, the levers for said one clutch member being pivotally connected to said spider adjacent its outer end, links each having one end connected to said one clutch member and their other ends connected to said last mentioned levers radially inwardly of their pivotal connection to said spider, the levers for said other clutch member being operatively connected at their ends to said other clutch member and pivotally connected at points radially inwardly therefrom to said spider.

3. In a double clutch assembly, a driving plate; a normally engaged, spring-biased friction clutch assembly including a pressure plate, and a driven plate engaging said pressure plate and said driving plate; a second normally engaged, spring-biased friction clutch assembly including a pressure plate, and a driven plate engaging said latter pressure plate and said driving plate; a cover connected to said driving plate; and release lever assemblies carried by said cover and operable to actuate said pressure plates to disengage said driven plates, said cover comprising a central portion having integral radial branch portions in equally circumferentially spaced relation radiating from the central portion, the lever assemblies for the respective pressure plates being equal to the branch portions in number and being circumferentially alternately arranged on said branch portions.

4. In a double clutch assembly, a driving plate having a plurality of lugs projecting laterally therefrom at one side thereof; a first friction clutch assembly disposed at one side of said driving plate and including a driven plate, and a pressure plate having radially extending lugs on its outer periphery and provided with slots receiving said lugs for movably mounting said pressure plate for engagement with said driven plate to pack said driven plate between said pressure and driving plates; a cover stamping having a central portion provided with integral radial channel-shaped branch portions in equally circumferentially spaced relation radiating from the central portion and having openings between the spaced side walls of said branch portions; a second friction clutch assembly disposed on the other side of said driving plate and including a driven plate, and a pressure plate having radially extending lugs extending into and supported in said openings of certain of said branch portions for movably mounting said pressure plate for movement into engagement with said driven plate to pack the latter plate between the pressure and driving plates; springs operative to urge said pressure plates into engagement with said driven plates; lever assemblies mounted on the side walls of said branch portions of said cover stamping for actuating said pressure plates, certain of said lever assemblies including members extending through openings in said cover stamping and driving plate and connected to the pressure plate of said first clutch assembly to disengage said pressure and driven plates of said first clutch assembly, and the other of said lever assemblies being operative to disengage said pressure and driven plates of said second clutch assembly.

5. In a double clutch assembly, a driving plate; first and second pressure plates at opposite sides of said driving plate; driven plates between said driving plate and respective pressure plates; means supporting said first pressure plate on said driving plate for movement to engage and disengage the adjacent driven plate and the latter plate with said driving plate; a cover connected to said driving plate and supporting said second pressure plate for movement to engage and disengage the adjacent driven plate and the latter plate with said driving plate; members extending through said pressure plates and driving plate and having one end abutting one of said pressure plates; springs engaging and compressed between the other of said pressure plates and the other ends of said members to urge said pressure plates into engagement with said driven plates; and means carried by said cover and operative to move said pressure plates to disengage said driven plates.

6. In a double clutch assembly, a driving plate; first and second pressure plates at opposite sides of said driving plate; driven plates between said driving plate and respective pressure plates; means supporting said first pressure plate on said driving plate for movement to engage and disengage the adjacent driven plate and the latter plate and the latter plate with said driving plate; a cover connected to said driving plate and supporting said second pressure plate for movement to engage and disengage the adjacent driven plate and the latter plate with said driving plate; members extending through said pressure plates and driving plate and having one end abutting one of said pressure plates; springs engaging and compressed between the other of said pressure plates and the other end of said members to urge said pressure plates into engagement with said driven plates; and release lever assemblies carried by said cover and selectively operable to disengage one or the other of said pressure plates with its engaged driven plate.

7. In a double clutch assembly, a driving plate; first and second pressure plates at opposite sides of said driving plate; driven plates between said driving plate and respective pressure plates; means supporting said first pressure plate on said driving plate for movement to engage and disengage the adjacent driven plate and the latter plate and said driving plate; a cover connected to said driving plate and supporting said second pressure plate for movement to engage and disengage the adjacent driven plate and the latter plate and said driving plate; members extending through said pressure plates and driving plating and having one end abutting one of said pressure plates; springs engaging and compressed between the other of said pressure plates and the other end of said members to urge said pressure plates into engagement with said driven plates; release lever assemblies carried by said cover and operable to disengage said first pressure plate from its engaged driven plate; release lever assemblies carried by said cover and operable to disengage said second pressure plate from its engaged driven plate; and means actuatable to operate said first-mentioned release lever assemblies and thereafter said second-mentioned release lever assemblies.

8. In a double clutch assembly, a driving plate; first and second pressure plates at opposite sides of said driving plate; driven plates between said driving plate and respective pressure plates; means supporting said first pressure plate on said driving plate for movement to engage and disengage the adjacent driven plate and thereby the latter plate with said driving plate; a cover connected to said driving plate and supporting said second pressure plate for movement to engage and disengage the adjacent driven plate and thereby the latter plate with said driving plate; members extending through said pressure plates and driving plate and having one end abutting one of said pressure plates; springs engaging and compressed between the other of said pressure plates and the other ends of said members to urge said pressure plates into engagement with said driven plates; first lever assemblies carried by said cover and connected to said first pressure plate and operable to move the first pressure plate to disengage said driven plate engaged therewith; second lever assemblies carried by said cover and connected to said second pressure plate and operable to move the second pressure plate to disengage the pressure plate engaged therewith; and an axially movable bearing operable to activate said first lever assemblies and thereafter said second lever assemblies.

9. In a clutch assembly, a drive plate; a driven plate; a pressure plate having axially extending lugs; a cover stamping having a central portion with radially extending branch portions of channel section connected to said drive plate, each branch portion having side walls provided with radially spaced sets of aligned openings, one set of said openings being radially outwardly of and larger than the other set of said openings, and a wall connecting said side walls and provided with slots receiving said pressure plate lugs for movement of said pressure plate to engage and disengage said driven plate with said pressure and drive plates; and lever assemblies carried by said cover and including a lever of channel section, a fulcrum member extending through the side walls of said lever and supported in the radially inner set of openings; and a pivot member extending through the side walls of said lever and said pressure plate lugs and into said radially outer set of openings.

10. In a clutch assembly, a drive plate; a driven plate; a pressure plate supported on said drive plate for movement to engage and disengage said driven plate with said drive and pressure plates; a cover having a central annular portion with radially extending branch portions of channel section connected to said drive plate, each branch portion having side walls provided with radially spaced sets of aligned openings, one set of said openings being inwardly of and larger than the other set of openings; and a wall connecting said side walls having an opening therethrough; lever assemblies supported by said cover for moving said pressure plate and each including a radially extending lever of channel section, a fulcrum member extending through the side walls of the lever and the radially outer set of openings in the side walls of said branch portion, an axially extending member projecting through the opening in the connecting wall of said branch portion and an opening in said drive plate and connected to said pressure plate, a pivot member extending into the radially inner set of openings in the side walls of said branch portion and through the side walls of the radially extending lever and one end of said axially extending member.

11. In a double clutch assembly; axially aligned first and second normally engaged, spring-biased friction clutches; release lever assemblies for said clutches including a set of radially extending levers for each clutch, said sets having operating portions spaced from one another along the axis of the clutches; and a release bearing supported for movement axially of said double clutch assembly and having a generally planar surface for engaging the operating portions of the levers of both sets; and means for moving the release bearing along the axis to operate the levers of said first lever set and thereafter to operate the levers of said second set while maintaining operated the levers of said first lever set.

12. In a double clutch assembly; axially aligned first and second normally engaged, spring-biased friction clutches comprising a common driving plate, and a driven plate and pressure plate mounted on each side of the driving plate and spring biased towards the driving plate; release lever assemblies for said clutches, including a set of radially extending levers for each clutch, said sets having operating portions spaced from one another along the axis of the clutches; and a release bearing supported for movement axially of said double clutch assembly and having a generally planar surface for engaging the operating portions of the levers of both sets; and means for moving the release bearing along the axis to operate the levers of said first lever set and thereafter to operate the levers of said second set while maintaining operated the levers of said first lever set.

References Cited in the file of this patent
UNITED STATES PATENTS

| | | |
|---|---|---|
| 1,705,032 | Short | Mar. 12, 1929 |
| 1,717,833 | Bullard et al. | June 18, 1929 |
| 2,237,322 | West | Apr. 8, 1941 |
| 2,261,432 | Cooke | Nov. 4, 1941 |
| 2,349,880 | Orelind | May 30, 1944 |
| 2,506,671 | Jacobi | May 9, 1950 |
| 2,540,639 | Winther | Feb. 6, 1951 |
| 2,589,308 | Thelander | Mar. 18, 1952 |
| 2,604,197 | Livermore | July 22, 1952 |
| 2,646,148 | Matrot | July 21, 1953 |

FOREIGN PATENTS

| | | |
|---|---|---|
| 457,023 | Great Britain | Nov. 19, 1936 |
| 635,042 | Great Britain | Mar. 29, 1950 |

UNITED STATES PATENT OFFICE
CERTIFICATE OF CORRECTION

Patent No. 2,880,833                                             April 7, 1959

James R. Stevenson et al.

It is hereby certified that error appears in the printed specification of the above numbered patent requiring correction and that the said Letters Patent should read as corrected below.

Column 8, line 15, for "plating" read -- plate --.

Signed and sealed this 21st day of July 1959.

(SEAL)
Attest:

KARL H. AXLINE                                           ROBERT C. WATSON
Attesting Officer                                    Commissioner of Patents